United States Patent
Mistry (10) Patent No.: US 9,239,711 B1
(45) Date of Patent: Jan. 19, 2016

(54) RUN BENCHMARK OR ANALYSIS TOOLS AGAINST MASSIVE REPOSITORY OF ARCHIVED WEBPAGES ON MACHINES IN THE CLOUD FOR CONTINUOUS BUILDS OR AD-HOC REQUESTS

(71) Applicant: GOOGLE INC., Mountain View, CA (US)

(72) Inventor: Ravi Mistry, Cary, NC (US)

(73) Assignee: GOOGLE INC., Mountain View, CA (US)

( * ) Notice: Subject to any disclaimer, the term of this patent is extended or adjusted under 35 U.S.C. 154(b) by 1 day.

(21) Appl. No.: 14/145,315

(22) Filed: Dec. 31, 2013

(51) Int. Cl.
G06F 9/45 (2006.01)
G06F 9/50 (2006.01)

(52) U.S. Cl.
CPC .............. *G06F 8/443* (2013.01); *G06F 9/5072* (2013.01); *G06F 9/5083* (2013.01); *G06F 9/5005* (2013.01)

(58) Field of Classification Search
CPC ...... G06F 8/443; G06F 9/5072; G06F 9/5083
See application file for complete search history.

(56) References Cited

U.S. PATENT DOCUMENTS

| | | | | |
|---|---|---|---|---|
| 5,542,088 A * | 7/1996 | Jennings, Jr. | ......... | G06F 9/4881 718/103 |
| 6,353,844 B1 * | 3/2002 | Bitar et al. | ..................... | 718/102 |
| 6,788,648 B1 * | 9/2004 | Peterson | ............... | G06F 9/5083 370/252 |
| 7,712,100 B2 * | 5/2010 | Fellenstein | ............ | G06Q 40/04 705/37 |
| 7,814,043 B2 | 10/2010 | Uchino | | |
| 8,250,009 B1 | 8/2012 | Breckenridge et al. | | |
| 8,819,653 B2 * | 8/2014 | Turner | ..................... | G06F 8/443 717/140 |
| 2002/0144255 A1 * | 10/2002 | Anderson | .................. | G06F 8/71 717/174 |
| 2005/0044067 A1 | 2/2005 | Jameson | | |
| 2005/0060163 A1 * | 3/2005 | Barsness | ................ | G06F 9/5072 705/1.1 |
| 2010/0306776 A1 * | 12/2010 | Greene | .......................... | 718/101 |
| 2011/0126209 A1 * | 5/2011 | Housty | .......................... | 718/105 |
| 2011/0246460 A1 | 10/2011 | Hsieh et al. | | |
| 2012/0284732 A1 * | 11/2012 | Griglock | ................ | G06F 9/5066 718/104 |
| 2013/0290539 A1 * | 10/2013 | Kodialam | .............. | G06F 9/5072 709/226 |
| 2013/0332913 A1 * | 12/2013 | Dickenson | .............. | G06F 8/443 717/158 |
| 2014/0109104 A1 * | 4/2014 | Majewski et al. | .............. | 718/104 |
| 2014/0189703 A1 * | 7/2014 | Gilder et al. | .................. | 718/104 |
| 2014/0280172 A1 * | 9/2014 | Amir et al. | ..................... | 707/740 |
| 2014/0331235 A1 * | 11/2014 | Lee | ........................ | G06F 9/5005 718/104 |

OTHER PUBLICATIONS

Xyetab Tang et al., "Optimizing Static Job Scheduling in a Network of Hetrogeneous Computers", [Online], 2000, pp. 373-382, [Retrived from Internet on Sep. 5, 2015], <http://ieeexplore.ieee.org/stamp/stamp.jsp?tp=&arnumber=876153>.*

Yang Gao et al., "Adaptive grid job scheduling with genetic algorithms", [Online], 2004, pp. 151-161, [Retrieved from Internet on Sep. 5, 2015], <http://ac.els-cdn.com/S0167739X04001505/1-s2.0-S0167739X04001505-main.pdf>.*

(Continued)

*Primary Examiner* — Xi D Chen
*Assistant Examiner* — Ziaul A Chowdhury
(74) *Attorney, Agent, or Firm* — Birch, Stewart, Kolasch & Birch, LLP (57) ABSTRACT

A system and method for selecting the number of machines from a cloud cluster needed for performing identical tasks with different inputs and outputs are disclosed. An example method receives an administrative task request from a user and determines the number of computing devices necessary to perform the request. The request may then be sharded into tasks across clusters of computing devices and the tasks may be run. The results from each computing device may be combined into a single result output and the output may be provided to a user.

16 Claims, 7 Drawing Sheets

(56) References Cited

OTHER PUBLICATIONS

Mark Baker et al., "Grids and Grid technologies for wide-area distributed computing", [Online], 2002, pp. 1-30, [Retrieved from Internet on Sep. 5, 2015], <http://www.cloudbus.org/~raj/papers/gridtech.pdf>.*

Gunho Lee et al., "Topology-Aware Resource Allocation for Data-Intensive Workloads", [Online], 2010, pp. 1-5, [Retrieved from Internet on Sep. 5, 2015], <http://delivery.acm.org/10.1145/1860000/1851278/p1-lee.pdf>.*

* cited by examiner

FIG. 1

All Tasks

Run Benchmarks  Run Scripts  Tasks History

General Information

| | |
|---|---|
| Browser was last built on | June 13, 2013, 6:29 p.m. |
| Browser Revision | 206102 |
| Skia Revision | 9588 |
| GCE Slave machines available | 100 |
| Number of webpages archived | 1000000 |
| Number of Total SKP files | 797698 |

(Last updated on June 20, 2013, 2:28p.m.)

[Rebuild Browser] [Recreate Pageset] [Recreate Webpage Archives]

All Admin Tasks

| User | Task | Requested Time | Completed Time |
|---|---|---|---|
| mistry | Recreate Webpage Archives | June 14, 2013, 3:56 p.m. | June 17, 2013, 9:52 p.m. |
| mistry | Recreate Pagesets | June 13, 2013, 10:23 p.m. | June 14, 2013 9:11 a.m. |
| mistry | Rebuild Browser | June 13, 2013, 2:49 p.m. | June 13, 2013, 5:24 p.m. |
| admin | Initial Table Creation | June 13, 2013, 1:41 p.m. | June 13, 2013, 1:41 p.m. |

All script runs history

| User | Description | Requested Time | Completed Time | Script Link | Output Link |
|---|---|---|---|---|---|
| ministry | Test 9 | June 20, 2013, 11:38 a.m. | June 20, 2013, 11:40 a.m. | script | output |
| ministry | Test 8 | June 20, 2013, 11:22 a.m. | June 20, 2013, 11:27 a.m. | script | output |
| ministry | Test 7 | June 19, 2013, 11:38 a.m. | June 19, 2013, 11:40 a.m. | script | output |

```
{
    "time_per_task_secs": 60,
    "total_num_of_tasks": 1000000,
    "max_allowed_time_for_request_secs": 360000,
    "memory_per_task_kb": 1024,
    "local_disk_per_task_kb": 1024,
    "cores_per_task": 1
}
```

FIG. 4

//Instance Cluster
{
 "cores_per_machine": 8
 "memory_per_machine_kb": 1024 * 10,
 "disk_per_machine_kb": 1024 * 1024 * 10
}

RUN BENCHMARK OR ANALYSIS TOOLS AGAINST MASSIVE REPOSITORY OF ARCHIVED WEBPAGES ON MACHINES IN THE CLOUD FOR CONTINUOUS BUILDS OR AD-HOC REQUESTS

BACKGROUND

Engineers working on software projects such as browsers or graphic libraries can optimize their code and test new features by running benchmarks, scripts, and other tasks on multiple computing machines using a repository of archived web pages as test data.

Conventional systems allow engineers to manually capture reusable archives of small sets of webpages to test code changes in continuous builds. However, such a small sample set has limited benefits since code changes may affect webpages differently. Expanding a small set of webpages to a massive repository with thousands to millions of webpage archives is difficult due to constraints such as disk space, processing power, and time. Additionally, deciding the number of machines necessary to perform a certain benchmark, script, or task may be problematic to determine.

SUMMARY

This specification describes technologies relating to code performance in general, and specifically to methods and systems for selecting the number of machines from a cloud cluster for identical tasks with different inputs and outputs.

In general, one aspect of the subject matter described in this specification can be embodied in a system and method for selecting the number of machines from a cloud cluster needed for performing identical tasks with different inputs and outputs. An example system includes one or more processing devices and one or more storage devices storing instructions that, when executed by the one or more processing devices, cause the one or more processing devices to execute an example method. An example method includes: receiving an administrative task request from a user; determining the number of computing devices necessary to perform the request; sharding the request into tasks across a cluster of computing devices according to the determined number of computing devices; running the tasks; combining the results from each computing device into a single result output; and providing the result output to the user.

These and other embodiments can optionally include one or more of the following features. Receiving a request from a user may include after the user has submitted the request to a web application, polling the web application to pick up the new request. Determining the number of machines necessary to perform the request may include: receiving a request configuration file that includes how long a single task in the request takes, the total number of tasks in the request, the limit on how long the request should take to complete, the amount of memory that should be available for a single task, the amount of local disk space that a task may use during execution, and the number of machine cores required for task execution; receiving a description configuration file describing the machines available in a particular datacenter including the number of cores available per machine, the memory available per machine, and the amount of disk space available in a machine; reading the request configuration file and the description configuration file; determining whether the time per tasks is greater than the maximum time allowed for completing the request; responsive to the time per tasks being less than or equal to the maximum time allowed for completing the request, determining whether the number of cores needed per task is greater than the number of cores available per machine; responsive to determining that the number of cores needed per task is less than or equal to the number of cores available per machine, determining whether the memory required per task is greater than the memory available on an individual machine; responsive to determining that the memory required per task is less than or equal to the memory available on an individual machine, determining if the disk space required per task is greater than the disk space available per machine; responsive to determining that the disk space required per task is less than or equal to the disk space available per machine, computing the minimum of machines needed to perform the request per task time, per number of cores, per available memory, and per disk space, and determining the maximum number of machines needed to perform the request by finding the maximum of the minimum number of machines needed to perform the request per task time, per number of cores, per available memory, and per disk space. Sharding the request into tasks across a cluster of computing devices according to the determined number of computing devices may include a master computing device pushing tasks to slave computing devices. Computing the minimum number of machines needed to perform the request per task time may include multiplying a total number of tasks required to complete the request with the time required for each task; dividing the result of the multiplication by the total time allotted for the request; and finding the ceiling of the result of the division. Computing the minimum number of machines needed to perform the request per number of cores may include multiplying a total number of tasks required to complete the request with the number of cores required per task; dividing the result of the multiplication by the number of cores available per machine in the cluster; and finding the ceiling of the result of the division. Computing the minimum number of machines needed to perform the request per available memory may include multiplying a total number of tasks required to complete the request with the amount of memory required per task; dividing the result of the multiplication by the amount of memory available per machine in the cluster; and finding the ceiling of the result of the division. Computing the minimum number of machines needed to perform the request per disk space may include multiplying a total number of tasks required to complete the request with the amount of disk space required per task; dividing the result of the multiplication by the amount of disk space available per machine in the cluster; and finding the ceiling of the result of the division.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

DETAILED DESCRIPTION

As recognized by the inventor, there needs to be a system that automates collection of a massive repository of web pages and allows benchmark or analysis tools to run against the webpages in an efficient manner in order for software engineers to analyze the performance of their codebases. An example system should include a method to determine the number of computing devices necessary to process a specified task in a requested amount of time.

Figure 1:
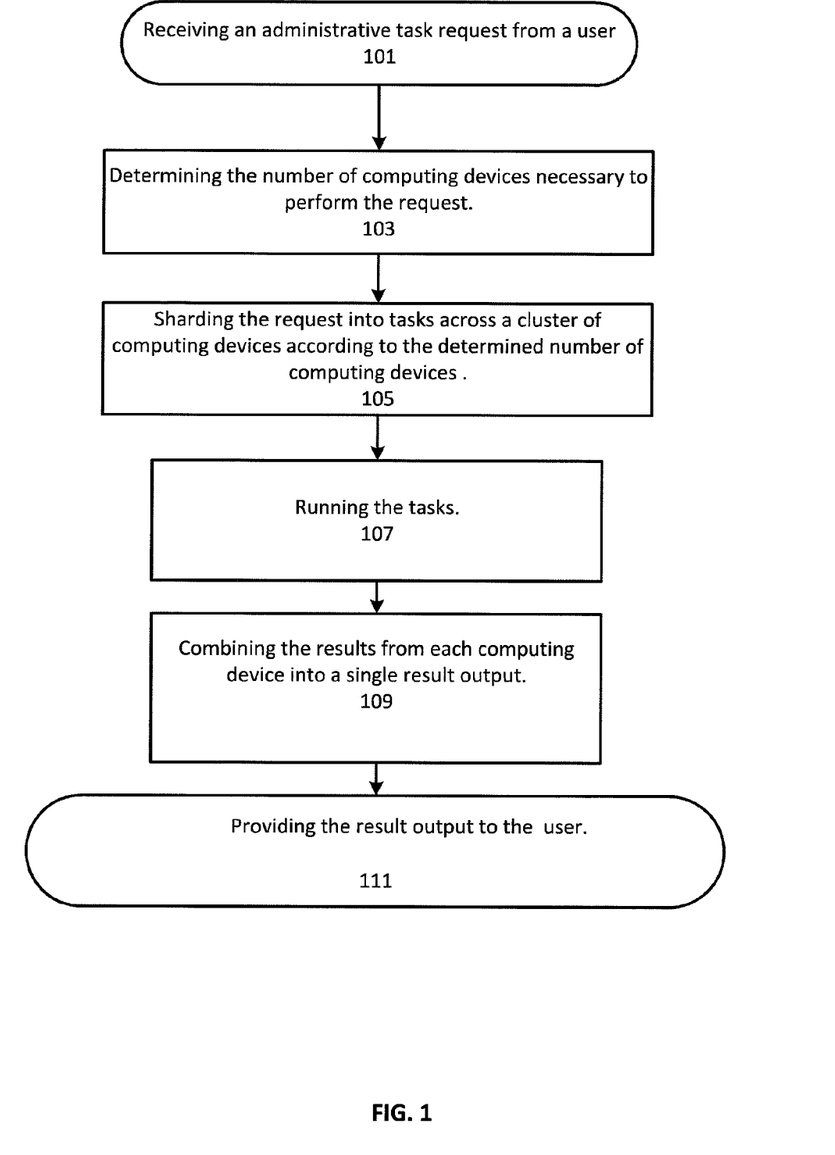
FIG. 1 is a flow diagram of an example method for selecting the number of machines from a cloud cluster for identical tasks with different inputs and outputs
Figure 2:
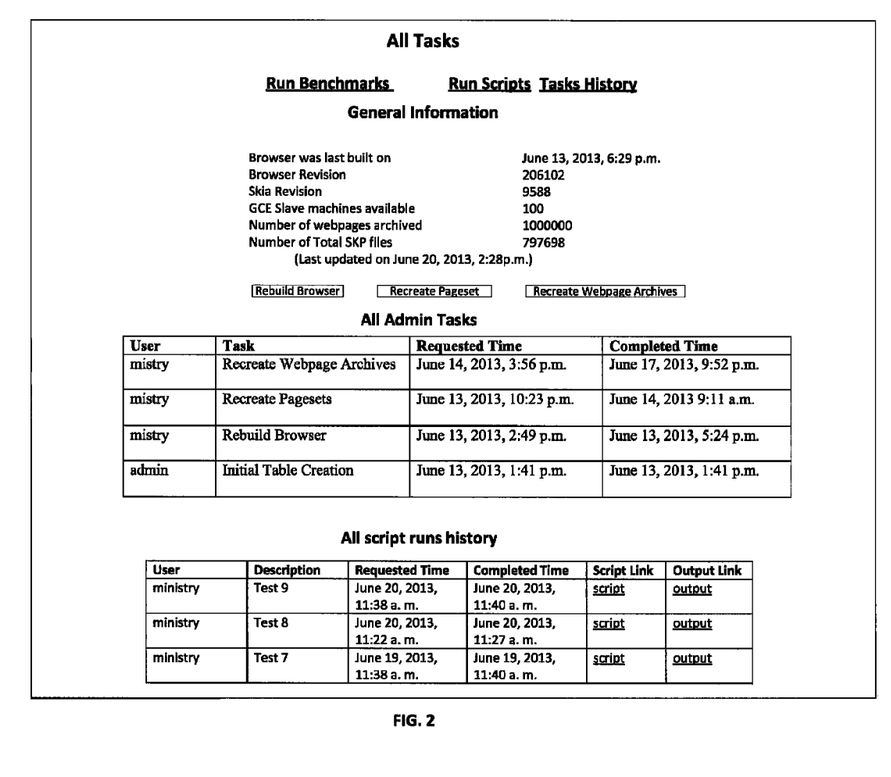
FIG. 2 is a block diagram illustrating an example user interface for inputting requests to an example system.

Aspects of the inventive concepts include a system, as described in FIG. 1, that receives an administrative tasks request (101), determines how many machines are needed to perform the request (103), shards the request into tasks across a cluster of computing devices according to the determined number of computing devices (105), runs the tasks (107), combines the results from each computing device into a single result output (109), and provides the result output to a user (111). An example system may receive requests to rebuild a web browser, recreate pagesets, or recreate webpage archives as shown in FIG. 2. Additionally, an example system may receive requests to perform specific script tasks or benchmark tasks.

For example, an example system may capture the archives of web pages for analysis of a codebase's code changes. The system may capture and archive a large number of web pages, e.g. at least a million web pages. These webpages may come from, for example, a list of top million web pages. The web pages may be archived using a local DNS and local HTTP/HTTPS servers which act as proxies and record performance metrics in addition to the actual resources. Software engineers or other users may then request that certain benchmark or analysis tasks be run against their project's code using these archived web pages. An example analysis task may be outputting the time taken by trace events in a rendering process of a browser; ordering the results by slowest first and finding web pages which took the longest and then working on optimizing code to make events faster. A second example may be to find the slowest functions in a browser for each web page and determining if these functions are slow on a majority of web pages. If so, there may be a focus on improving performance of these functions.

As discussed above, benchmark or analysis task requests may be made through a user interface of the example system by a user providing information to specify benchmarks and benchmark arguments. FIG. 1 also shows that users may view the history of all their code runs through this user interface. Additionally, users may automatically rebuild their projects on the example system's cluster of cloud machines by specifying a rebuild on the webpage. Furthermore, administrators may refresh the massive repository of webpage archives by specifying a refresh on the webpage.

Figure 3:
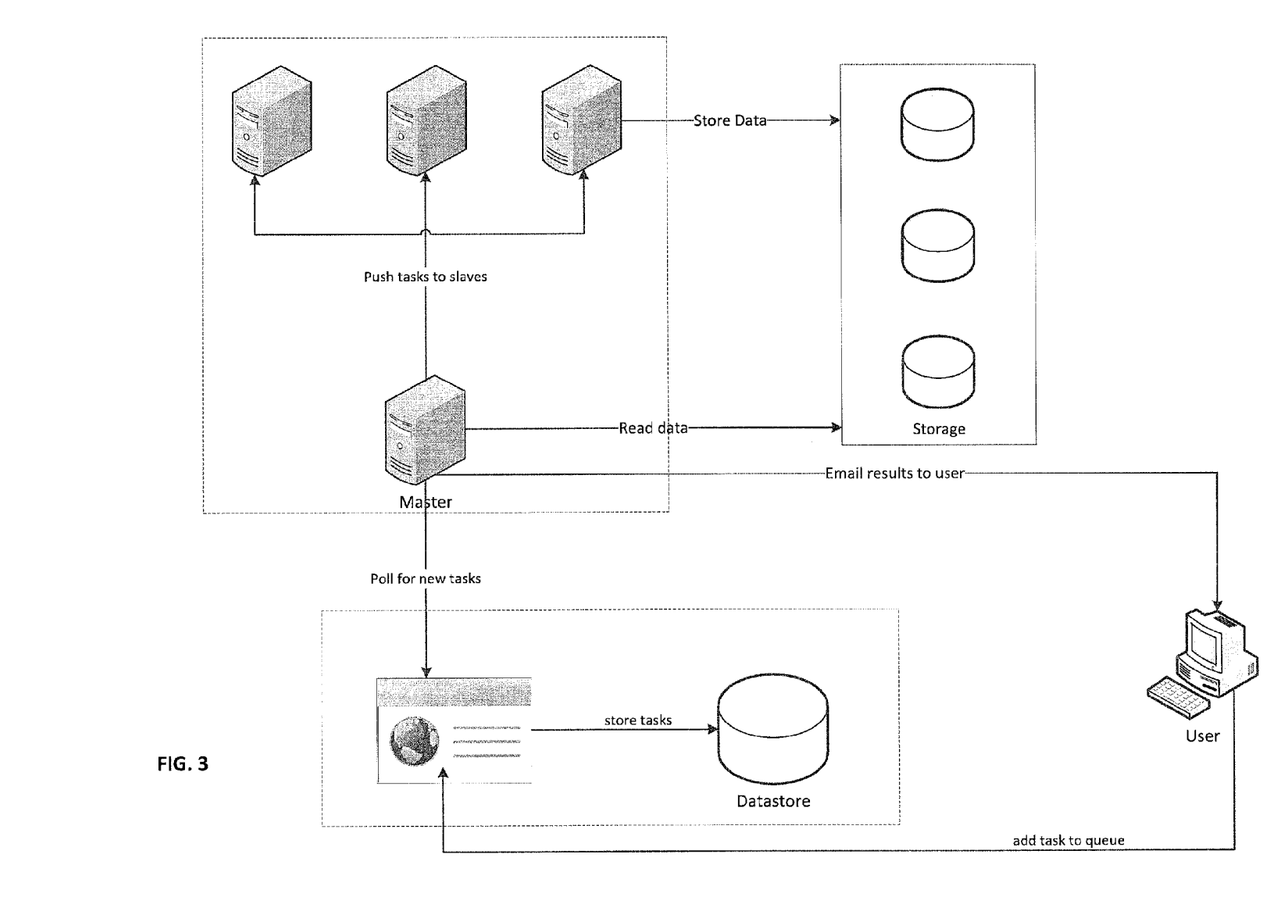
FIG. 3 is a block diagram illustrating an example system for automating user requests across clusters of computing devices.

When a user requests that the example system run perform an administrative task, the system may shard the run, or divide the user's request into smaller tasks, in the cloud among a large cluster of machines Processing may be done by a cluster of computers in the cloud using a master/slave setup as shown in FIG. 3. The master instances may be responsible for receiving benchmark and analysis tasks and pushing the tasks to slave instances which generate artifacts to a cloud framework. A system may run an example method in order to determine how to divide tasks among machines. The assumption for a task request is that the request contains multiple tasks, each task may be identical, but may have different inputs and outputs. The tasks may also not run in parallel. An example request may be received to capture the archives of the top one million web pages. If each task captures the archive for one particular web page, a million tasks may be needed to capture the one million web pages.

Once the tasks have completed processing, another method may be run to combine the processing results from the machines. The results may then be provided to the user who requested the benchmark analysis. Generated artifacts such as reports and logs may be stored in the cloud storage framework and may be accessible by the requester when the task completes.

As discussed above, an example method may calculate the number of machines in the cluster of computers in the cloud that are necessary to run a user requested task in the amount of time that the user specifies or with a wait time acceptable to the user.

Figure 4:
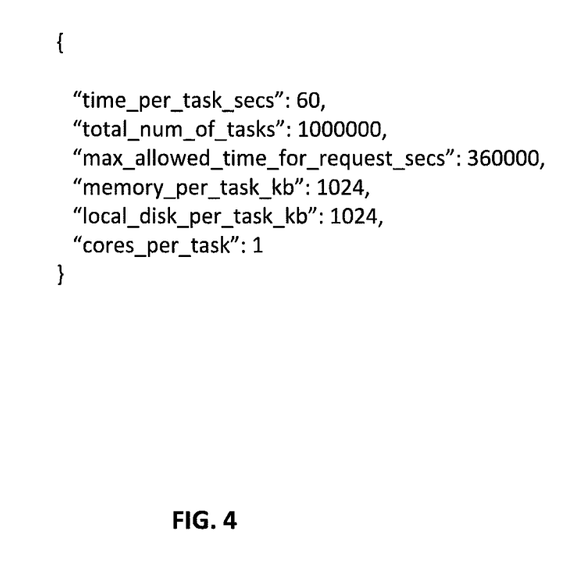
FIG. 4 is an example request configuration file.
Figure 5:
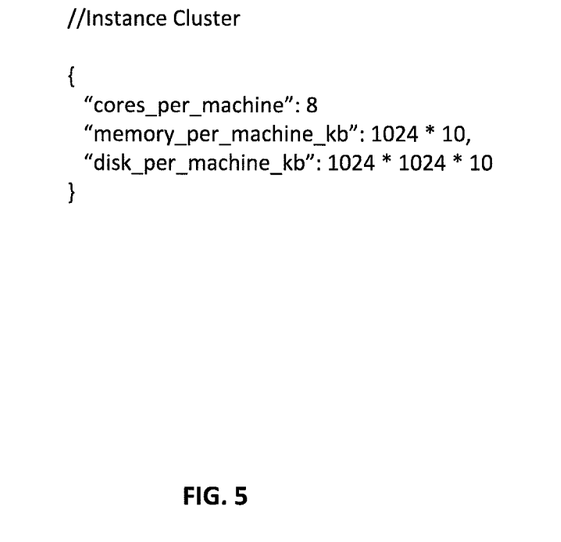
FIG. 5 is an example machine configuration file.

An example request may contain or be in the form of a configuration file that details the requirements of the tasks within the request and the maximum allowed time allowed to complete the request. An example partial request configuration file is shown in FIG. 4. The request configuration file may specify several parameters (pieces of information/variables) related to the request including: how long a single task in the request takes; the total number of tasks in the request; the limit on how long the request should take; the amount of memory in kilobytes that should be available for a single task; the amount of local disk space in kilobytes that a task may take up during execution; and the number of machine cores required for the execution of a task. An example method may also require a machine configuration file that describes a machine available in a datacenter, e.g. an instance in a cluster. As shown in FIG. 5, an example description of a cluster instance may include: the number of cores per machine available, the memory per machine in kilobytes, and the amount of disk space in kilobytes that are available on the instance.

An example method for determining the amount of machines necessary to complete a request in an allotted time may begin by receiving a request and a description of available machines. A request and a description of available machines may be in configuration file forms as discussed above. An example method may read the request configuration file and determine if the time per tasks is greater than the maximum time allowed for the request. If the time per tasks is greater than the maximum time allowed for the request, the method may fail since no amount of machines will be able to complete the tasks in the allotted time. In some embodiments, instead of failing, an example system may provide the amount of time needed by the system to perform the request. The user may then decide if this time allocation is acceptable. If the method does not fail, the method may then check to see if the number of cores needed per task is greater than the number of cores available per machine in the cluster. If the number of cores needed is greater than the number of cores available per machine, the method may fail since no machine will be capable of completing a task. If the method does not fail, the method may check to see if the memory required per task is greater than the memory available per machine in the cluster. If the memory required is greater than the memory available on an individual machine, the method may fail. If the method does not fail, the method may then check to see if the disk space required per task is greater than the disk space available per machine in the cluster. If there is not enough disk space per machine to perform the task, the method may fail. If the method does not fail, the example method may then determine the minimum number of machines needed to perform the request per task time, per cores, per memory, and per disk space.

To find the minimum number of machines needed to perform the request by amount of task time, the total number of tasks may be multiplied with the time required for each task. Then the result may be divided by the total time allotted for the request. After the division, an example method may find the ceiling of the resulting number, meaning the smallest integer that is not less than the resulting number.

The minimum number of machines needed per cores may be found by multiplying the number tasks required to complete a request by the number of cores required per task. The result may then be divided by the cores available per machine in the cluster. The ceiling of the resulting number may then be found.

The minimum number of machines needed per disk space may be found by multiplying the total number of tasks in a request by the amount of disk space necessary per task. The result may then be divided by the amount of disk space available per machine in the cluster and then the ceiling may be found.

The minimum number of machines needed per memory may be found by multiplying the total number of tasks in a request by the amount of memory necessary per task. The result may then be divided by the amount of memory available per machine in the cluster and then the ceiling may be found.

The minimum number of machines necessary for a request may be found by finding the maximum number of machines needed from the minimum number of machines needed per task time, per cores, per disk space, and per memory. The number of tasks per machine should then be the ceiling of the number of total tasks divided by the number of machines available in the cluster.

Some clusters may have different machine configurations with different costs associated with each machine type. The total cost of these configurations may be calculated using different machine configurations in the above method. To find the lowest cost and use different machine types, cost can be the limiting factor instead of time and a dynamic programming method may be used to find the machine types to achieve the specified maximum cost.

Figure 6:
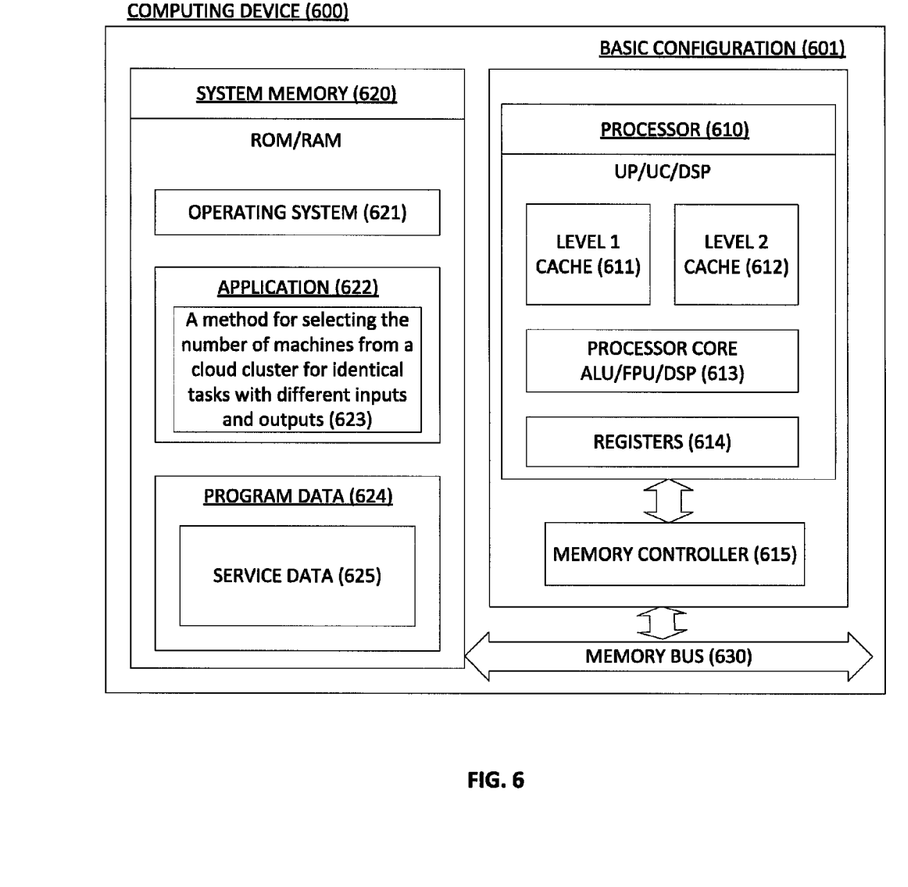
FIG. 6 is a block diagram illustrating an example computing device.

FIG. 6 is a high-level block diagram of an example computer (600) that is arranged for performing administrative tasks in a manner that improves efficiency and performance in a distributed computing system. In a very basic configuration (601), the computing device (600) typically includes one or more processors (610) and system memory (620). A memory bus (630) can be used for communicating between the processor (610) and the system memory (620).

Depending on the desired configuration, the processor (610) can be of any type including but not limited to a microprocessor (µP), a microcontroller (µC), a digital signal processor (DSP), or any combination thereof. The processor (610) can include one more levels of caching, such as a level one cache (611) and a level two cache (612), a processor core (613), and registers (614). The processor core (613) can include an arithmetic logic unit (ALU), a floating point unit (FPU), a digital signal processing core (DSP Core), or any combination thereof. A memory controller (616) can also be used with the processor (610), or in some implementations the memory controller (615) can be an internal part of the processor (610).

Depending on the desired configuration, the system memory (620) can be of any type including but not limited to volatile memory (such as RAM), non-volatile memory (such as ROM, flash memory, etc.) or any combination thereof. System memory (620) typically includes an operating system (621), one or more applications (622), and program data (624). The application (622) may include a method for selecting the number of machines from a cloud cluster for identical tasks with different inputs and outputs. Program Data (624) includes storing instructions that, when executed by the one or more processing devices, implement a method for efficiently processing an administrative task in a cloud cluster. (623). In some embodiments, the application (622) can be arranged to operate with program data (624) on an operating system (621).

The computing device (600) can have additional features or functionality, and additional interfaces to facilitate communications between the basic configuration (601) and any required devices and interfaces.

System memory (620) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of the device (600).

The computing device (600) can be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. The computing device (600) can also be implemented as a personal computer including both laptop computer and non-laptop computer configurations.

Figure 7:
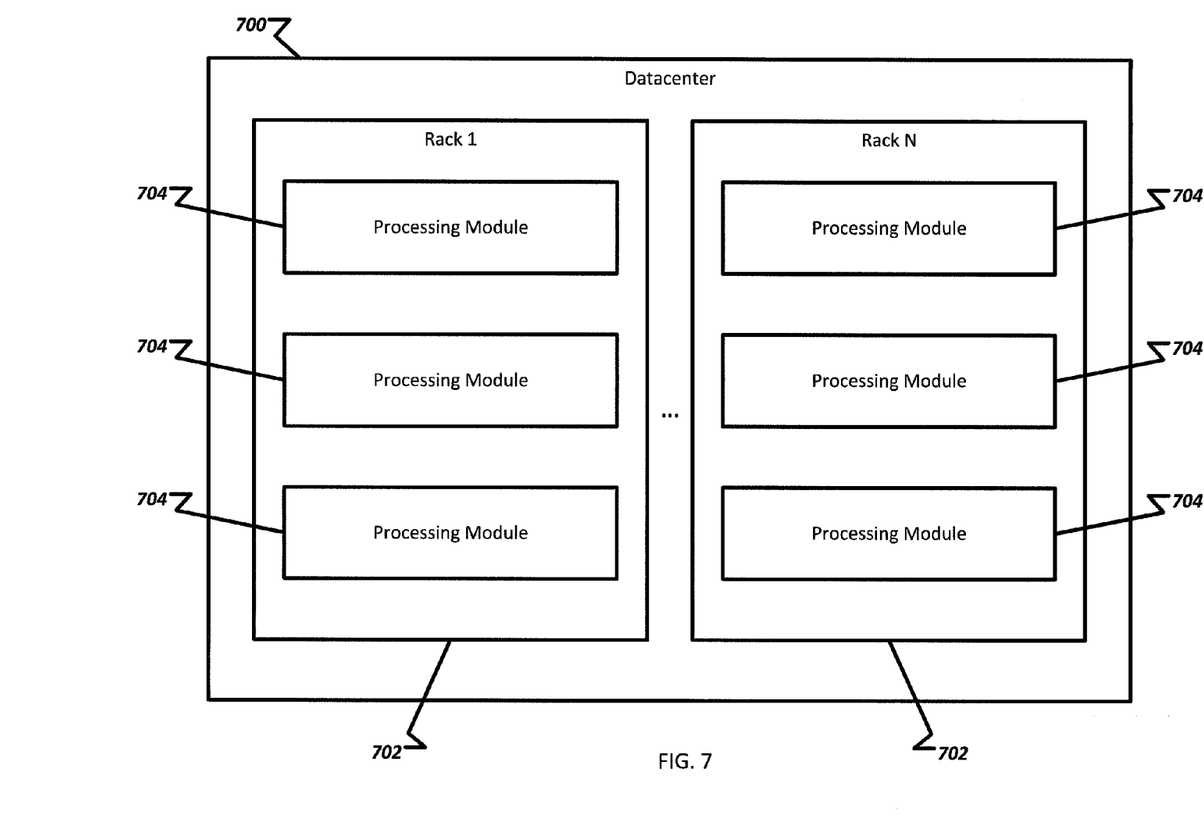
FIG. 7 is an example datacenter.

FIG. 7 is a block diagram illustrating an example of a datacenter (700) where individual applications are executed and sampling occurs. The datacenter (700) is used to store data, perform computational tasks, and transmit data to other systems outside of the datacenter using, for example, a network connected to the datacenter. In particular, the datacenter (700) may perform large-scale data processing on massive amounts of data.

The datacenter (700) includes multiple racks (702). While only two racks are shown, the datacenter (700) may have more racks. Each rack (702) can include a frame or cabinet into which components, such as processing modules (604), are mounted. In general, each processing module (704) can include a circuit board, such as a motherboard, on which a variety of computer-related components are mounted to perform data processing. The processing module (704) within each rack (702) are interconnected to one another through, for example, a rack switch, and the racks (702) within each datacenter (700) are also interconnected through, for example, a datacenter switch.

In some implementations, the processing modules (704) may each take on a role as a master or worker. The master modules control scheduling and data distribution tasks among themselves and the workers. A rack can include storage, like one or more network attached disks, that is shared by the one or more processing modules (704) and/or each processing module (704) may include its own storage. Additionally, or alternatively, there may be remote storage connected to the racks through a network.

The datacenter (700) may include dedicated optical links or other dedicated communication channels, as well as supporting hardware, such as modems, bridges, routers, switches, wireless antennas, and towers. The datacenter (700) may include one or more wide area network (WANs) as well as multiple local area networks (LANs).

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), other integrated formats, or as a web service. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., fiber optics cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for selecting the number of machines from a cloud cluster needed for performing identical tasks with different inputs and outputs, the method comprising:
   receiving an administrative task request from a user, the administrative task request including a plurality of identical tasks having different inputs and outputs;
   receiving a request configuration files that includes an amount time required to complete a single one of the plurality of identical tasks, the total number task in the request, and a limit on how long the request should take to complete, and
   wherein the request configuration file further includes the amount of memory that should be available for a single task, the amount of local disk space that the task may use during execution, and the number of machine cores required for task execution;
   determining the number of machines necessary to perform the request includes receiving a description configuration file describing the machines available in a particular datacenter including the number of cores available per machine, the memory available per machine, and the amount of disk space available in a machine;
   determining whether the time required to complete the plurality of identical tasks is greater than the maximum time allowed for completing the request;
   determining, in response to the time required to complete the plurality of identical tasks being less than or equal to the maximum time allowed for completing the request, the number of computing devices necessary to perform the request;
   sharding the request into tasks across a cluster of computing devices according to the determined number of computing devices;
   running the tasks;
   combining the results from each computing device into a single result output; and
   providing the result output to the user.

2. The method of claim 1, wherein receiving a request from a user includes:
   after the user has submitted the request to a web application, polling the web application to pick up the new request.

3. The method of claim 1,
   wherein determining the number of machines necessary to perform the request further includes:
   reading the description configuration file;
   responsive to the time per tasks being less than or equal to the maximum time allowed for completing the request, determining whether the number of cores needed per task is greater than the number of cores available per machine;
   responsive to determining that the number of cores needed per task is less than or equal to the number of cores available per machine, determining whether the memory required per task is greater than the memory available on an individual machine;
   responsive to determining that the memory required per task is less than or equal to the memory available on an individual machine, determining if the disk space required per task is greater than the disk space available per machine;
   responsive to determining that the disk space required per task is less than or equal to the disk space available per machine, computing the minimum number of machines needed to perform the request per task time, per number of cores, per available memory, and per disk space, and
   determining the maximum number of machines necessary to perform the request by finding the maximum of the minimum number of machines needed to perform the request per task time, per number of cores, per available memory, and per disk space.

4. The method of claim 1, wherein sharding the request into tasks across a cluster of computing devices according to the determined number of computing devices includes a master computing device pushing tasks to slave computing devices.

5. The method of claim 3, wherein computing the minimum number of machines needed to perform the request per task time includes:

multiplying a total number of tasks required to complete the request with the time required for each task;
dividing the result of the multiplication by the total time allotted for the request; and
finding the ceiling of the result of the division.

6. The method of claim 3, wherein computing the minimum number of machines needed to perform the request per number of cores includes:
multiplying a total number of tasks required to complete the request with the number of cores required per task;
dividing the result of the multiplication by the number of cores available per machine in the cluster; and
finding the ceiling of the result of the division.

7. The method of claim 3, wherein computing the minimum number of machines needed to perform the request per available memory includes:
multiplying a total number of task required to complete the request with the amount of memory required per task;
dividing the result of the multiplication by the amount of memory available per machine in the cluster; and
finding the ceiling of the result of the division.

8. The method of claim 3, wherein computing the minimum number of machines needed to perform the request per disk space includes:
multiplying a total number of tasks required to complete the request with the amount of disk space required per task;
dividing the result of the multiplication by the amount of disk space available per machine in the cluster; and
finding the ceiling of the result of the division.

9. A system for selecting the number of machines from a cloud cluster needed for performing identical tasks with different inputs and outputs, the system comprising:
one or more processing devices; and
one or more storage devices storing instructions that, when executed by the one or more processing devices, cause the one or more processing devices to:
receive an administrative task request from a user, the administrative task request including a plurality of identical tasks having different inputs and outputs;
receive a request configuration files that includes an amount time required to complete a single one of the plurality of identical tasks, the total number task in the request, and a limit on how long the request should take to complete;
wherein the request configuration file further includes the amount of memory that should be available for the single task, the amount of local disk space that the task may use during execution, and the number of machine cores required for task execution;
determine the number of machines necessary to perform the request includes receiving a description configuration file describing the machines available in a particular datacenter including the number of cores available per machine, the memory available per machine, and the amount of disk space available in a machine;
determine whether the time required to complete the plurality of identical tasks is greater than the maximum time allowed for completing the request;
determine, in response to the time required to complete the plurality of identical tasks being less than or equal to the maximum time allowed for completing the request, the number of computing devices necessary to perform the plurality of identical tasks;
shard the request into tasks across a cluster of computing devices according to the determined number of computing devices;
run the tasks;
combine the results from each computing device into a single result output; and
provide the result output to the user.

10. The system of claim 9, wherein receiving a request from a user includes:
after the user has submitted the request to a web application, polling the web application to pick up the new request.

11. The system of claim 9,
wherein determining the number of machines necessary to perform the request further includes:
reading the description configuration file;
responsive to the time per tasks being less than or equal to the maximum time allowed for completing the request, determining whether the number of cores needed per task is greater than the number of cores available per machine;
responsive to determining that the number of cores needed per task is less than or equal to the number of cores available per machine, determining whether the memory required per task is greater than the memory available on an individual machine;
responsive to determining that the memory required per task is less than or equal to the memory available on an individual machine, determining if the disk space required per task is greater than the disk space available per machine;
responsive to determining that the disk space required per task is less than or equal to the disk space available per machine, computing the minimum number of machines needed to perform the request per task time, per number of cores, per available memory, and per disk space; and
determining the maximum number of machines necessary to perform the request by finding the maximum of the minimum number of machines needed to perform the request per task time, per number of cores, per available memory, and per disk space.

12. The system of claim 9, wherein sharding the request into tasks across a cluster of computing devices according to the determined number of computing devices includes a master computing device pushing tasks to slave computing devices.

13. The system of claim 11, wherein computing the minimum number of machines needed to perform the request per task time includes:
multiplying a total number of tasks required to complete the request with the time required for each task;
dividing the result of the multiplication by the total time allotted for the request; and
finding the ceiling of the result of the division.

14. The system of claim 11, wherein computing the minimum number of machines needed to perform the request per number of cores includes:
multiplying a total number of tasks required to complete the request with the number of cores required per task;
dividing the result of the multiplication by the number of cores available per machine in the cluster; and
finding the ceiling of the result of the division.

15. The system of claim 11, wherein computing the minimum number of machines needed to perform the request per available memory includes:
multiplying a total number of tasks required to complete the request with the amount of memory required per task;
dividing the result of the multiplication by the amount of memory available per machine in the cluster; and
finding the ceiling of the result of the division.

16. The system of claim 11, wherein computing the minimum number of machines needed to perform the request per disk space includes:
- multiplying a total number of tasks required to complete the request with the amount of disk space required per task;
- dividing the result of the multiplication by the amount of disk space available per machine in the cluster; and
- finding the ceiling of the result of the division.

* * * * *